(12) United States Patent
Knisely et al.

(10) Patent No.: US 6,207,090 B1
(45) Date of Patent: Mar. 27, 2001

(54) METHOD FOR MANUFACTURING A FILM-COVERED ARTICLE

(75) Inventors: David Charles Knisely, Commerce Township; Dale Paul Moore, Plymouth; Zinoviy Chernyak, Farmington Hills, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/058,974

(22) Filed: Apr. 13, 1998

(51) Int. Cl.$^7$ .................................................. B29C 45/14

(52) U.S. Cl. .......................... 264/138; 264/156; 264/163; 264/266; 425/112; 425/127; 425/129.1; 425/290

(58) Field of Search .................................... 264/513, 156, 264/163, 266, 269; 425/127, 129.1, 112, 290

(56) References Cited

FOREIGN PATENT DOCUMENTS

| | | |
|---|---|---|
| 0497335 A2 | 1/1992 | (EP) . |
| 0623443 A1 | 2/1993 | (EP) . |
| 0686474 A1 | 12/1994 | (EP) . |
| 1544917 | 10/1976 | (GB) . |
| 2265329 | 3/1992 | (GB) . |

*Primary Examiner*—Jan H. Silbaugh
*Assistant Examiner*—Edmund H. Lee
(74) *Attorney, Agent, or Firm*—Larry Shelton

(57) ABSTRACT

A method of manufacturing a film-covered article. A moveable press having first and second mold surfaces is moved to an open position. The first mold surface has a sealing surface, and the second mold surface has a cutting surface. A thin flexible film having an offal portion is placed between the first and second mold surfaces. The offal portion is positioned between the sealing and cutting surfaces and acts as a seal between the mold halves. The press is moved to the closed position. The cutting surface contacts the film and partially cuts the offal portion along a perimeter of the film. The offal portion remains positioned between the cutting and sealing surfaces and seals the space between the first and second mold surfaces.

15 Claims, 3 Drawing Sheets

METHOD FOR MANUFACTURING A FILM-COVERED ARTICLE

BACKGROUND OF INVENTION

1. Field of the Invention

Present invention is directed to a method for forming a film-covered article. More specifically, the present invention is directed to providing a method of forming a perforated tear seam along a perimeter of a film to remove an offal portion from the molded article.

2. Description of the Related Arts

It is also known to manufacture molded articles using flexible films wherein the film is placed within a mold and a polymer is injected behind the film to heat and soften the film backing. The film backing fuses to the polymer to form a molded article. One difficulty of this construction is that it generally produces an edge of film or fabric that must be either trimmed or folded to present a neat appearance. One example of edge trimming is illustrated in commonly assigned U.S. patent application Ser. No. 08/903,523, titled: "METHOD AND APPARATUS FOR MANUFACTURING A FILM-COVERED ARTICLE". This application teaches a method and apparatus for trimming a film placed between two molds. The offal portion of the film is cut by shear edges on the mold. The offal portion is separated from the film and must be separately removed from the mold press.

In highly automated injection molding presses, the area between the molds is generally inaccessible to the machine operator. By separating the offal portion from the film, the offal portion must be removed independently from the finished part. Because the offal portion is generally thin and irregularly shaped, it is difficult to design robotically controlled equipment to remove the offal portion from between the molds. It is desirable for the offal portion to remain attached to the finished article for easy removal at a location remote from the mold press.

Another method of producing a film-covered article is illustrated in U.S. Pat. No. 5,599,608. A flat film sheet is thermoformed to have an in-turned portion. The film is trimmed to the final desired measurement and is then placed within a molding apparatus. The mold core engages the in-turned portion and folds the edge of the film within the mold. Molten plastic is injected into the mold cavity and the combination of closing the mold combined with the pressure of the molten plastic material forces the in-turned edge portion against the mold wall to form the covered edge of the molded article.

This method requires a complicated pre-molding operation that thermoforms the film to have an in-turned portion and then trims the film prior to placing the film within the mold. The film has only a small in-turned portion that must lie within the mold and may not be used to properly position the film within the mold or retain the film while the mold is closed. Because the film is totally encased between the mold halves, it may not be used to seal the space between the molds.

These deficiencies and problems are overcome by the present invention.

SUMMARY OF THE INVENTION

The present invention is directed to a method of manufacturing a film-covered article by the following steps. A moveable press having first and second mold surfaces is moved to an open position. The first mold surface has a sealing surface and the second mold surface has a cutting surface. A thin flexible film having an offal portion is placed between the first and second mold surfaces. The offal portion is positioned between the sealing and cutting surfaces and acts as a seal between the mold halves.

The press is moved to the closed position. The cutting surface contacts the film and at least partially cuts the offal portion along a perimeter of the film. The offal portion remains positioned between the cutting and sealing surfaces and seals the space between the first and second mold surfaces.

A molten plastic is injected between the first and second mold surfaces and adheres to the film to form the finished article. The article has a plastic backing against the perimeter of the film. When the cutting surface is serrated, the film is perforated along the perimeter of the film. The perforated perimeter forms a tear seam that allows the operator to easily remove the offal portion of the film without tools. The offal portion may be removed at a location remote from the molding press so that it does not litter the injection molding equipment.

These and other desired objects of the present invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
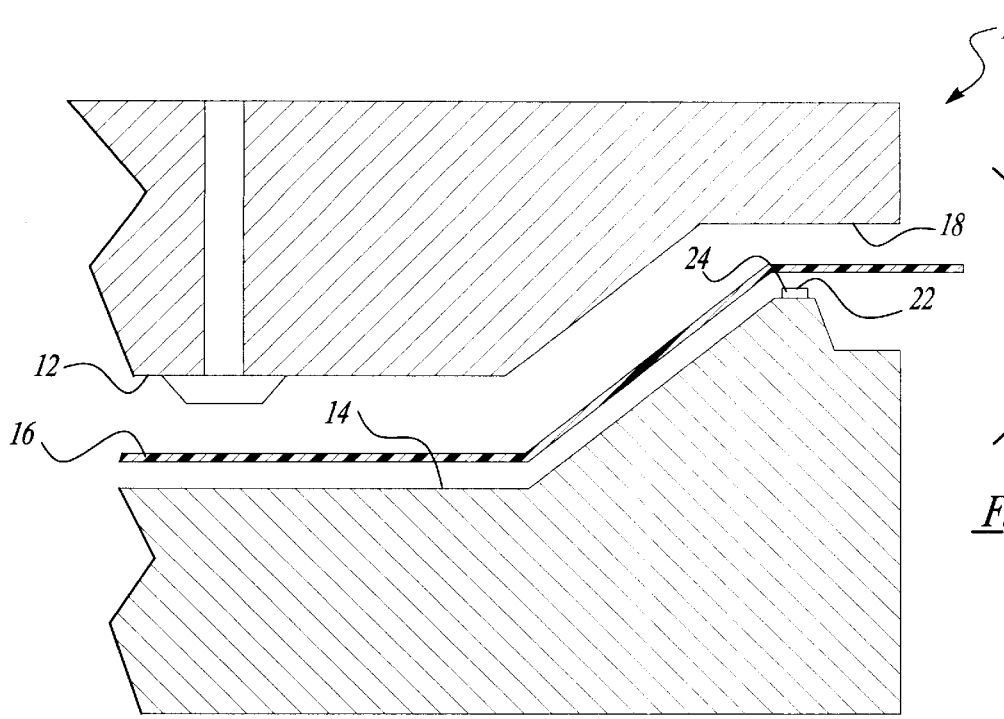
FIG. 1 is a cross-sectional view of an injection molding press in an open position.

The present invention will be described through a series of drawings, which illustrate the molding of an article having a flexible film and at least partially cutting the film during the molding operation. The following items are a word list of the items described in the drawings and are reproduced to aid in understanding the invention:

10 mold press
12 first mold surface
14 movable second mold surface
16 film
18 sealing surface
20 space
22 cutting surface
24 cutting teeth
26 plastic resin
28 inlet 30 film covered article
32 offal portion
34 tear seam
36 slits
38 periphery
40 recessed portion
42 cutter
44 knife-edge
46 fixed cutting surface
48 pin
50 shoulder portion Illustrated in FIG. 1 is a moveable mold press 10 having a first mold surface 12 and a moveable second mold surface 14. The first mold surface 12 receives a pre-molded flexible thermoformed film 16. The film 16 may be either a thin film such as Avloy™ manufactured by Avery Dennison or ISF™ manufactured by 3M/Rexam. Alternatively, the film may be a thick film such as polyvinyl chloride or thermoplastic urethane. Other types of films are also useful in the present invention. The film 16 has a decorative surface against the second mold surface 14 and a backing sheet opposite the decorative surface. The film 16 is placed against the second mold surface 14 and is held in position by an interference (press) fit between the film 16 and the second mold surface 14. It may be desirable to use an automatic film loader (not shown) to position the film against the second mold surface 14 when the mold press is generally inaccessible to the press operator. An example of a suitable automated film loader is illustrated and described in co-pending U.S. patent application Ser. No. 09/009,753, titled: "METHOD AND APPARATUS FOR LOADING A PRE-MOLDED FILM INTO A MOLD", which is incorporated herein by reference.

Figure 2:
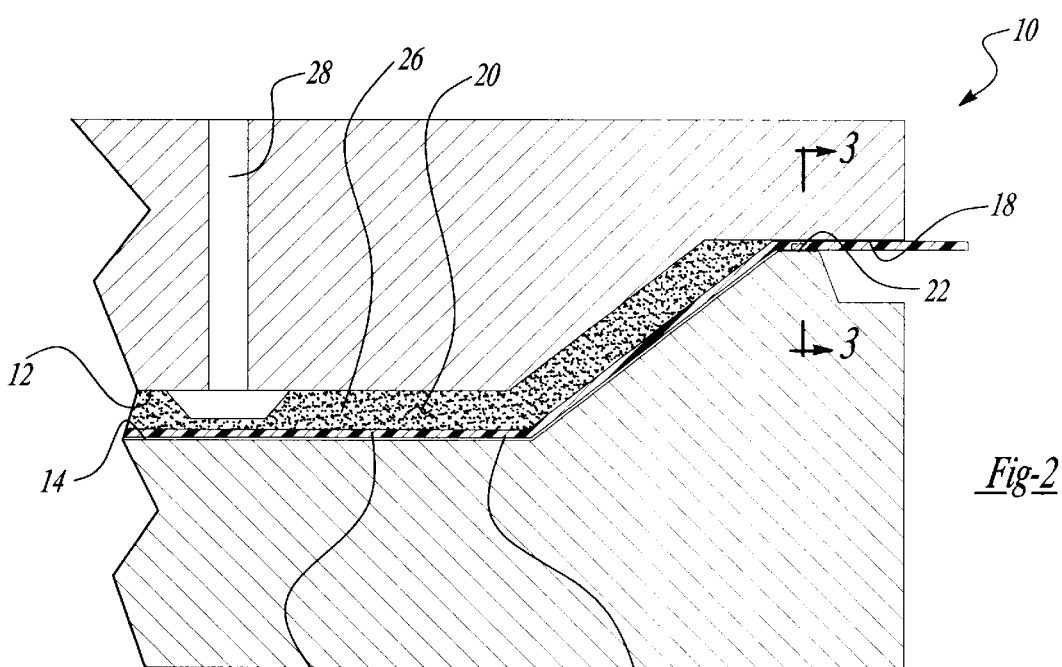
FIG. 2 is the injection molding press as illustrated in FIG. 1, in the closed position after molten resin is injected between the mold halves.

After the film 16 is loaded onto the second mold surface 14, the press 10 is moved to the closed position as illustrated in FIG. 2. The first mold surface 12 has a sealing surface 18 around its perimeter to enclose a space 20. The second mold surface has a narrow cutting surface 22 that contacts the film 16 and pinches the film 16 between the cutting surface 22 and the sealing surface 18. The cutting surface 22 is designed to be sufficiently narrow so as to cut through the film 16 when the mold is in the closed position. When using films having a thickness of 0.01–0.04 inches, the width of the cutting surface 22 is approximately between 0.020–0.040 inches.

Figure 3:
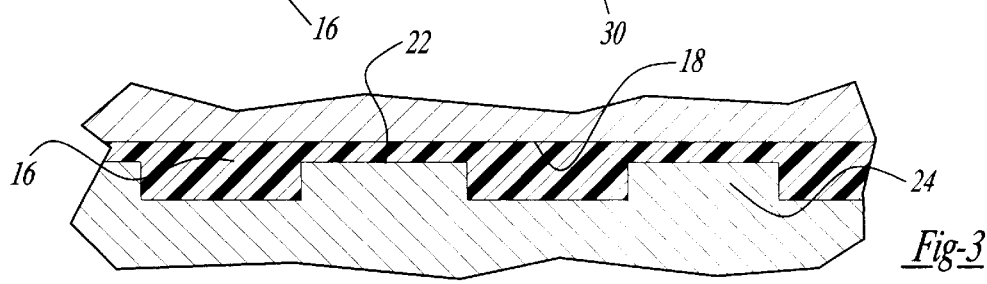
FIG. 3 is a detailed cross-sectional view of the area marked "A" in FIG. 2, taken along the lines 3—3.

The cutting surface 22 may optionally be designed to have a serrated edge to form a perforated tear seam. Illustrated in FIG. 3 is a detailed cross-sectional view of the mold press area "A", taken along the lines 3—3 in FIG. 2. The cutting surface 22 includes a plurality of raised cutting teeth 24 that cut through the film 16. The raised cutting teeth have a width of between 0.02 and 0.04 inches and are spaced apart sufficiently to form a perforation that retains the offal portion on the film 16 after molding.

Figure 4:
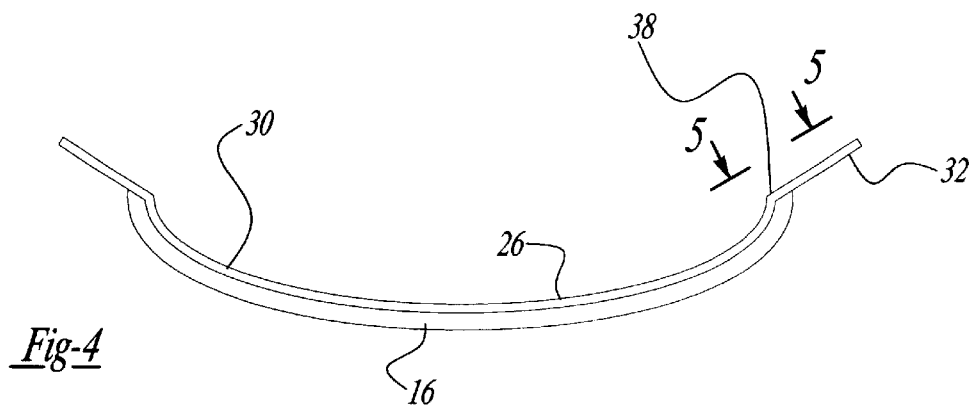
FIG. 4 is a side view of a molded article after it is removed from the press with the offal portion attached.
Figure 5:
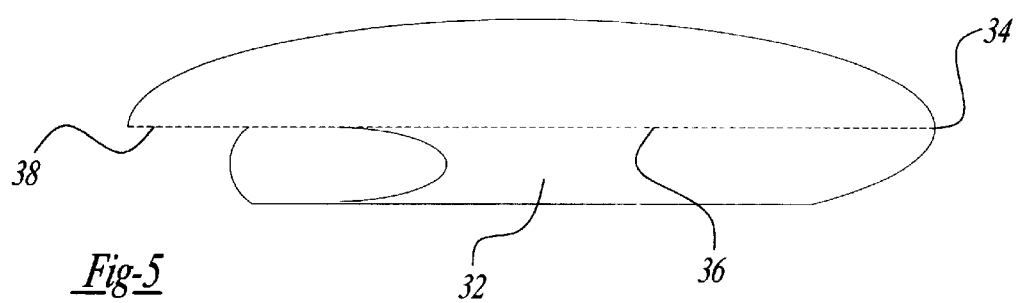
FIG. 5 is a detailed view of the area marked "B" in FIG. 5, taken along the lines 5—5, removing the offal portion along the tear seam.

After the mold press 10 is moved to the closed position, a molten plastic resin 26 is injected through the resin inlet 28 into space 20. The plastic resin 26 heats and softens the backing surface of film 16 and adheres thereto. The plastic resin 26 is retained within the space 20 by the action of the film 16 being pinched between the cutting surface 22 and the sealing surface 18. After the resin 26 cools, the resin and film form a film-covered article 30. The article 30 is removed from the press 10. At this time, the article 30 includes an offal portion 32 that extends beyond the perimeter of the article 30 as illustrated in FIGS. 4 and 5.

The offal portion 32 is attached to the article 30 by a perforated tear seam 34. The tear seam 34 includes a plurality of slits 36 formed by the cutting teeth 24 as illustrated in FIG. 3. The slits 36 enable the easy removal of the offal portion 32. An operator pulls on the offal portion 32 at a right angle. The offal portion 32 tears along the tear seam 34. The article 30 has a trimmed periphery 38 where the film is backed by plastic resin and displays a finished appearance. The offal portion may be removed by the operator without special tools or equipment. Previous methods of removing the offal portion included sharp knives that may damage the article or expensive equipment that required customization for each article. The present method enables the operator to remove the offal portion as it is moved from the molding machine to a storage or transportation area.

Another benefit of the present invention is that the offal portion is removed in an area remote from the injection-molding machine. It is useful to include the offal portion during the molding operation because it assists in positioning and retaining the film within the mold. The offal portion is also useful to seal the mold during molding. However, most high-volume, large-scale injection molding equipment is controlled by automated control equipment. The area between the molds is generally inaccessible to the press operator. The molded articles are usually removed by robotically controlled equipment. Removing the offal portion during the molding operation would require an additional tool. Because the offal is usually a thin, flexible material, it is difficult to manipulate with robotic equipment. The present invention enables the offal portion to assist in positioning and retaining the film in the injection molding press while being easily separated after the article is removed from the tool.

The invention may also be practiced using a recessed portion on the first mold surface to better enable mold sealing and to cut through more flexible films. The embodiment illustrated in FIG. 6 includes a recessed portion 40 on the first mold surface 12. The recessed portion is generally V-shaped and is positioned radially outwardly of the space 20. The recessed portion 40 receives a movable cutter 42. Cutter 42 includes a knife-edge 44 that at least partially cuts through the film 16. The cutter 42 is operated by a hydraulic or pneumatic cylinder to extend the cutter 42 after the press 10 is moved to the closed position. The cutter 42 stays in the extended position during the injection process and is retracted to remove the article 30.

The moveable cutter 42 is especially preferred when cutting a hole through the film 16 such as a cut-out for lighting or attaching fixtures. A moveable slide may also be useful if the perforation is relatively small.

Figure 7:
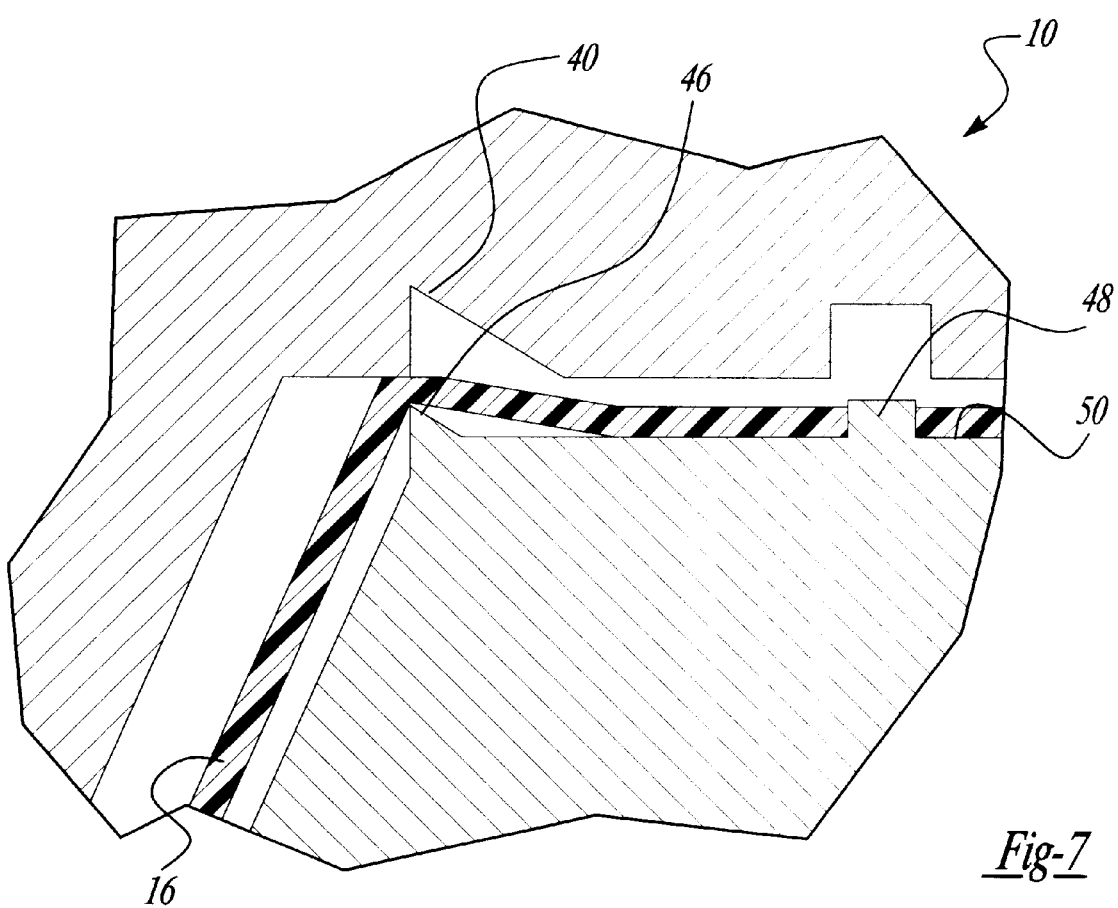
FIG. 7 is a cross-sectional view of yet another alternative embodiment of the present invention using a raised cutting surface.

In yet another alternative embodiment of the present invention, a fixed cutting surface is used to fit within a groove as is illustrated in FIG. 7. The embodiment illustrated in FIG. 7 uses a generally V-shaped recessed portion 40 with a fixed cutting surface 44. The cutting surface 46 contacts the film 16 when the mold press 10 is closed and at least partially cuts the film 16 between the cutting surface 46 and the recessed portion 40. A pin 48 on shoulder portion 50 retains the film 16 in position so that the film 16 may be more easily cut by the cutting surface 46.

Figure 6:
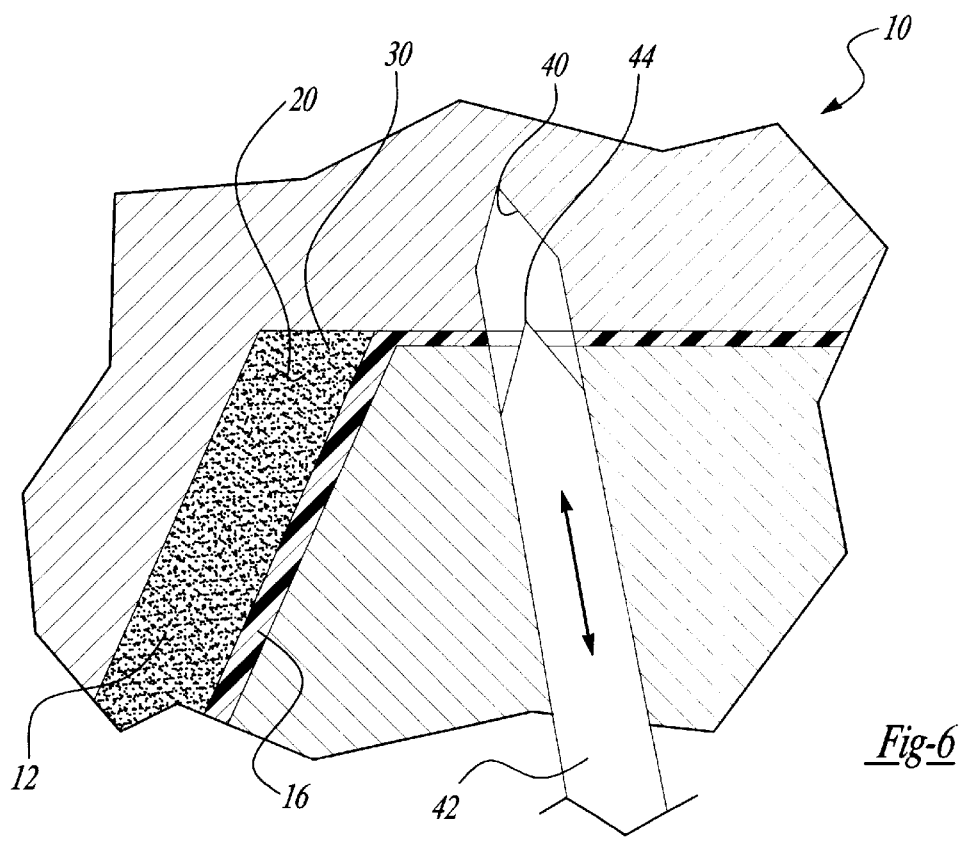
FIG. 6 is a cross-sectional view an alternative embodiment of the present invention using a movable cutting slide.

The cutting action illustrated in FIGS. 6 and 7 shears the film between the cutting surface and the recessed portion. This action is especially useful for because it allows for different film 16 thicknesses. When the film 16 is thicker, the space or gap between the recessed portion 40 and the cutter 42 or cutting surface 44 is increased. Thinner films 16 have a narrower space or gap between the recessed portion 40 and the cutter 42 or cutting surface 44.

The invention has been illustrated using a single cutting surface 22, 46 or knife-edge 44, but multiple cutting surfaces or cutters may be positioned around the entire periphery of the article. In the case of a moveable cutter 42, multiple cutters operating in a sequential or alternating fashion may be used to trim around corners. In addition to the perforated cutting pattern illustrated, it may be possible to uniformly cut the film without causing the film to separate from the article while in the mold press.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method of manufacturing a film-covered article comprising the steps of:

providing a moveable press having first and second mold surfaces, said first mold surface having a sealing surface and said second mold surface having a cutting surface;

placing a film having an offal portion between said first and second mold surfaces, said offal portion being placed between said sealing surface and said cutting surface;

closing said press and causing said cutting surface to contact said film and partially cut said offal portion of said film to create a cut line, said offal portion remaining partially attached to said film, and said offal portion remaining between said sealing surface and said cutting surface;

injecting molten plastic between said first and second mold surfaces and adhering said plastic to said film to form said article, whereby said article has a plastic backing against said film with the partially cut offal portion attached to said film; and removing without tools, at a location remote from the press, the partially cut offal portion from said film of said article along said cut line.

2. The method of claim 1, wherein said first mold surface is stationary and said second mold surface is moveable.

3. The method of claim 2, wherein said first mold surface includes a recessed portion.

4. The method of claim 3, wherein said cutting surface extends within said recessed portion when said press is moved to a closed position.

5. The method of claim 1, further comprising a shoulder area on said second mold surface and retaining said offal portion against said shoulder area, whereby said film is retained in position between said first and second mold surfaces.

6. The method of claim 1, wherein said offal portion prevents said plastic material from escaping past said sealing surface.

7. The method of claim 1, wherein said cutting surface imparts a perforated tear seam between said article and said offal portion.

8. The method of claim 1, wherein said cutting surface is movable independently from said second mold surface and said cutting surface is moved into contact with said offal portion.

9. A method of manufacturing a film-covered article comprising the steps of:

providing a moveable press having a first mold surface and a second mold surface, said first mold surface having a sealing surface and said second mold surface having a cutting surface;

placing a film having an offal portion between said first and second mold surfaces, said offal portion being placed between said sealing surface and said cutting surface;

closing said press and causing said cutting surface to contact said film and imparting a perforated tear seam on said offal portion;

injecting molten plastic between said first and second mold surfaces and adhering said plastic to said film to form said article before opening said press, whereby said article has a plastic backing against said film with said offal portion attached to said film of said article by said perforated tear seam;

opening said press and removing said article and removing without tools, at a location remote from said press, said offal portion from said film of said article along said perforated tear seam.

10. The method of claim 9, wherein said first mold surface is stationary and said second mold surface is moveable.

11. The method of claim 9, wherein said first mold surface includes a recessed portion.

12. The method of claim 11, wherein said cutting surface extends within said recessed portion when said press is moved to a closed position.

13. The method of claim 9, further comprising a shoulder area on said second mold surface and retaining said offal portion against said shoulder area, whereby said film is retained in position between said first and second mold surfaces.

14. The method of claim 9, wherein said offal portion prevents said plastic material from escaping past said sealing surface.

15. A method of manufacturing a film-covered article comprising the steps of:

providing a moveable press having a stationary first mold surface and a moveable second mold surface, said first mold surface having a recessed sealing surface and said second mold surface having a cutting surface;

placing a film having an offal portion between said first and second mold surfaces, said offal portion being placed between said sealing surface and said cutting surface;

retaining said offal portion on a shoulder area on said second mold surface;

closing said press and causing said cutting surface to contact said film and imparting a perforated tear seam on said offal portion;

injecting molten plastic between said first and second mold surfaces and adhering said plastic to said film to form said article before opening said press, whereby said article has a plastic backing against said film with said offal portion attached to said film of said article by said perforated tear seam;

opening said press and removing said article; and removing without tools, at a location remote from said press said offal portion by tearing said film along said perforated tear seam.

* * * * *

UNITED STATES PATENT AND TRADEMARK OFFICE
CERTIFICATE OF CORRECTION

PATENT NO. : 6,207,090,B1  
DATED : March 27, 2001  
INVENTOR(S) : David Charles Knisely, Dale Paul Moore, Zinoviy Chernyak Page 1 of 1

It is certified that error appears in the above-identified patent and that said Letters Patent is hereby corrected as shown below:

Column 5,  
Lines 29-30, "film to create a cut line," should be -- film, thereby creating a cut line --  
Line 52, "area" should be -- are --.  
Line 58, "said cutting surface" should be -- said second cutting surface --.

Column 6,  
Line 19, "said article and" should be -- said article; and --.  
Line 37, "prevents said plastic material from" should be -- prevents said plastic from --.

Signed and Sealed this

Eighteenth Day of December, 2001

*Attest:*

*Attesting Officer*

JAMES E. ROGAN  
*Director of the United States Patent and Trademark Office*